G. C. JONES.
COOKER.
APPLICATION FILED JULY 7, 1920.
1,371,687.
Patented Mar. 15, 1921.
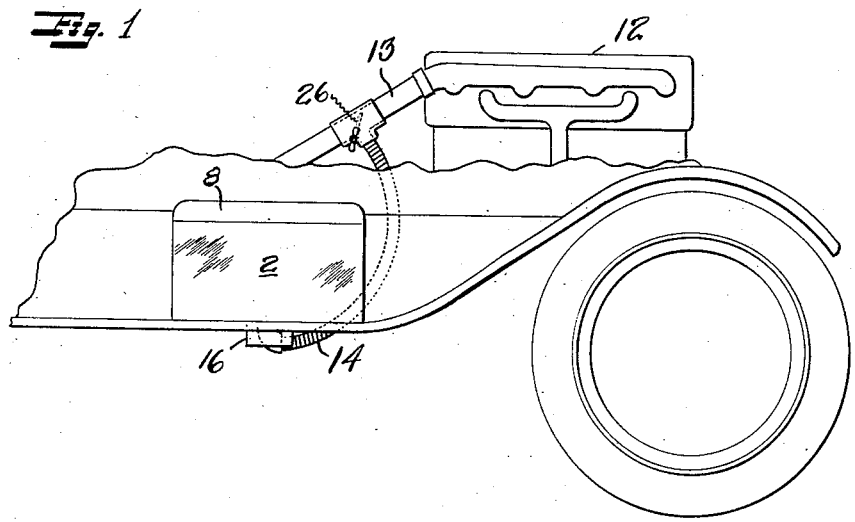
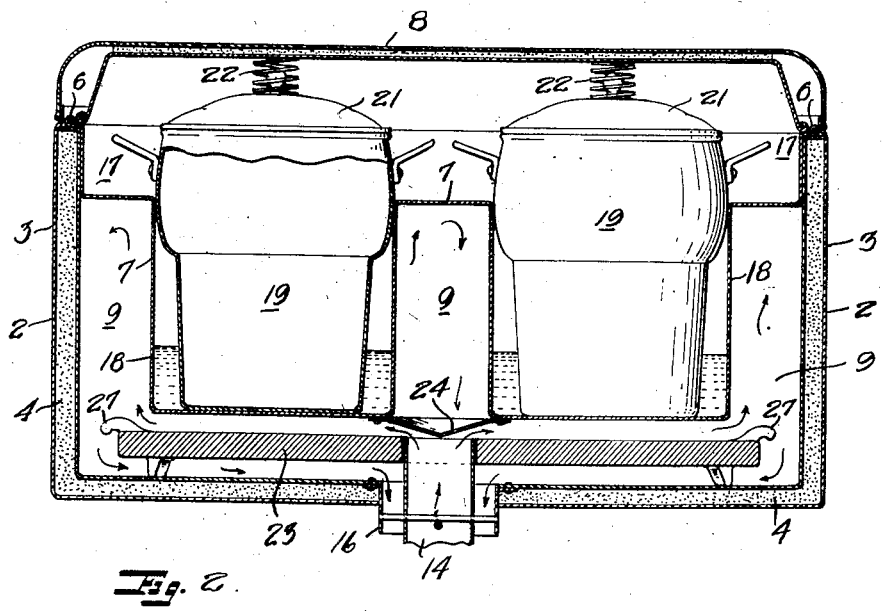
INVENTOR
GEORGE COLEMAN JONES
BY Joseph B. Gardner
ATTORNEY

UNITED STATES PATENT OFFICE.

GEORGE COLEMAN JONES, OF OAKLAND, CALIFORNIA.

COOKER.

1,371,687.  Specification of Letters Patent.  Patented Mar. 15, 1921.

Application filed July 7, 1920. Serial No. 394,484.

*To all whom it may concern:*

Be it known that I, GEORGE COLEMAN JONES, a citizen of the United States, and a resident of Oakland, county of Alameda, and State of California, have invented a new and useful Cooker, of which the following is a specification.

My invention relates to a fireless cooker such as may be carried by an automobile and heated by the exhaust gases of the engine thereof.

An object of the invention is to provide a cooker which will cook the food by steam that is generated through the agency of the hot exhaust gases of an engine.

Another object of the invention is to provide a fireless cooker, of the type having a removable heating element, in which the said element is arranged in a chamber sealed from the steam or cooking chamber.

A further object is to provide a cooker in which the heating element may be placed in the cooker and heated therewith by the hot exhaust gases of an engine, thereby enabling the food to be cooked or kept warm even after the engine is stopped.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a side elevation of my cooker showing it connected to an automobile, just sufficient of the latter being shown to illustrate the connections.

Fig. 2 is an enlarged vertical section of the cooker.

Briefly expressed the present embodiment of my invention comprises an outer casing and an inner casing between which is formed a gas chamber that is connected to the exhaust pipe of the automobile engine. The inner casing which is provided with a cover and termed a steam chamber is adapted to contain water which is transformed into steam through the agency of the hot exhaust gases circulating in the gas chamber. The water or steam chamber is formed so as to conveniently receive one or more receptacles in which the food may be cooked. A removable heating element is disposed in the gas chamber and is so arranged with respect to the gas inlet and discharge thereof that the steam chamber as well as itself will be effectively heated while the cooker is in use.

A detailed description follows:

The cooker of my invention may be conveniently supported upon the running board of the automobile and comprises an outer casing 2 preferably having hollow walls 3 filled with heat insulating material 4. Removably arranged in the outer casing and supported by flanges 6 which rest upon the upper edge of the walls 3, is an inner casing 7 provided with a cover 8 which is preferably hinged to and extends over the outer casing 2. The upper portion of the inner casing adjacent the flanges 6 fits tightly against the inner wall of the outer casing, but the remaining portion of the inner casing is preferably spaced therefrom so that a chamber 9 sealed from the inner casing is formed therebetween. The chamber 9, which I shall hereafter refer to as the gas chamber, is adapted to be filled with the hot exhaust gases of the automobile engine 12 and to this end the exhaust pipe 13 thereof is preferably provided with a branch 14 which extends into the chamber. An outlet for the spent exhaust gases in the gas chamber is afforded by the discharge pipe 16 provided in the bottom of the outer casing.

The inner casing is arranged to be filled with a quantity of water which is transformed into steam when the gases circulating in the gas chamber are of the proper temperature. With the cover 8 tightly fitted over the casing, the steam will be confined therein so that a steam chamber 17 completely sealed from the gas chamber 9 is thus formed. The bottom of the steam chamber is preferably formed with a plurality of depressed portions 18 which extend into the gas chamber and are arranged to receive cooking receptacles 19. The covers 21 of the receptacles as well as the receptacles themselves are retained in proper position, in spite of the jarring and vibration of the automobile, by means of a spring 22 interposed between the receptacle cover 21 and the steam chamber cover 8. The walls of the depressed portion 18 and the receptacles 19 should preferably be spaced from each other so that the steam can be more readily generated and allowed to surround the receptacles. In the present form of the invention this spacing is had by forming the side walls of the receptacles somewhat narrower than the side walls of the depressed portion 18, but it is obvious that this spacing could be provided in many other ways.

Arranged in the gas chamber between and spaced from the bottom wall of the depressed portions 18 and bottom of the outer casing 2, is a removable heating element 23 which, on account of the fact that it is entirely removed from the cooking chamber and the corroding factor thus immaterial, may be made of cast iron or other such inexpensive material. By referring to Fig. 2 it will be seen that the intake pipe 14 extends through the heating element so that the hot gases strike the conical deflector 24 and are at once distributed uniformly around the depressed extensions of the steam chamber, causing the water to be quickly transformed into steam. As the gases become cooler they sink to the bottom, pass under the heating element, and then discharge through the outlet 16. With the hot gases passing around the heating element in the manner described, the steam can be quickly generated and the element itself so thoroughly heated that the food may continue cooking or kept warm for a considerable time after the introduction of the exhaust gases to the gas chamber has ceased.

The amount of exhaust gases which may enter the cooker are readily controlled by a valve 26 that is arranged at the juncture of the exhaust pipe and the branch 14. If desirable the valve may be manipulated from the dash of the automobile by a rod (not shown) which can be connected to the valve in the usual manner.

Should the occasion arise that it would be necessary to heat the element outside of the cooker, the inner casing may then be removed and the element lifted out by means of the lugs 27 preferably cast thereon. To replace the parts it is of course merely necessary to reverse the operation.

It is obvious that if desirable the heating element may be at any time removed and the cooker operated without it.

I claim:

1. In combination with the exhaust pipe of an engine, a cooker having a gas chamber provided with an inlet connected to said pipe and an outlet, a steam chamber extending into said gas chamber and sealed therefrom, a cooking receptacle removably disposed in said steam chamber, and means for resiliently retaining said cooking receptacle in said steam chamber.

2. In combination with the exhaust pipe of an engine, a cooker having a gas chamber provided with an inlet connected to said pipe and an outlet, a substantially vertically disposed steam chamber having its sides lying within and its bottom spaced from said gas chamber, and a removable heating element arranged in the walls of said gas chamber below said steam chamber.

3. In combination with the exhaust pipe of an engine, a cooker comprising an outer casing, a removable inner casing adapted to contain steam and spaced from said outer casing to form therebetween a gas chamber, a cooking receptacle disposed in and spaced from said inner casing, and a removable heating element arranged in said gas chamber adjacent said cooking receptacle.

4. In combination with the exhaust pipe of an engine, a cooker comprising an outer casing, an inner casing adapted to contain steam and spaced from said outer casing to form therebetween a gas chamber, a cooking receptacle disposed in said inner casing, a heating element arranged in said gas chamber and spaced from both the inner and outer casings, a branch from said exhaust pipe extending into said chamber and opening into the area between the heating element and the inner casing, and a discharge passage in said outer casing.

5. In combination with the exhaust pipe of an engine, a cooker comprising an outer casing, a removable inner casing adapted to contain steam and spaced from said outer casing to form therebetween a gas chamber, a cooking receptacle disposed in said inner casing, a removable heating element arranged in said gas chamber and spaced from both the inner and outer casings, a branch extending from said exhaust pipe to said chamber and opening in the area between said heating element and the inner casing, and a discharge in said outer casing adjacent said heating element.

In testimony whereof I have hereunto set my hand at Oakland, California, this 29th day of June, 1920.

GEORGE COLEMAN JONES.

In presence of—
FLOY CRANE.